(12) United States Patent
Yaakoby

(10) Patent No.: US 11,255,405 B2
(45) Date of Patent: Feb. 22, 2022

(54) VIBRATION PREVENTION IN A LINEAR ACTUATOR

(71) Applicant: Aquarius Engines (A.M.) Ltd., Rosh Haayin (IL)

(72) Inventor: Shaul Yaakoby, Rishon le Zion (IL)

(73) Assignee: AQUARIUS ENGINES (A.M.) LTD., Rosh Haayin (IL)

( * ) Notice: Subject to any disclaimer, the term of this patent is extended or adjusted under 35 U.S.C. 154(b) by 947 days.

(21) Appl. No.: 15/769,816

(22) PCT Filed: Oct. 20, 2016

(86) PCT No.: PCT/IB2016/001678
§ 371 (c)(1),
(2) Date: Apr. 20, 2018

(87) PCT Pub. No.: WO2017/068427
PCT Pub. Date: Apr. 27, 2017

(65) Prior Publication Data
US 2020/0248778 A1    Aug. 6, 2020

Related U.S. Application Data

(60) Provisional application No. 62/243,677, filed on Oct. 20, 2015.

(51) Int. Cl.
*F16F 15/02* (2006.01)
*F16F 15/22* (2006.01)
(Continued)

(52) U.S. Cl.
CPC .............. *F16F 15/02* (2013.01); *F16F 15/22* (2013.01); *F16F 15/26* (2013.01); *F16F 15/28* (2013.01); *H02K 5/24* (2013.01)

(58) Field of Classification Search
CPC ........ F16F 15/02; F16F 15/1202; F16F 15/14; F16F 15/22; F16F 15/26; F16F 15/261;
(Continued)

(56) References Cited

U.S. PATENT DOCUMENTS 1,040,472 A    10/1912  Wade
1,707,035 A    3/1929   Wurfel
(Continued)

FOREIGN PATENT DOCUMENTS

DE    3149930 A1    8/1982
DE    3347859 A1    6/1985
(Continued)

OTHER PUBLICATIONS

International Search Report and Written Opinion dated Mar. 31, 2017, in International Application No. PCT/IB2016/001678 (10 pgs.).
(Continued)

*Primary Examiner* — Adam D Rogers
(74) *Attorney, Agent, or Firm* — Finnegan, Henderson, Farabow, Garrett & Dunner, LLP

(57) ABSTRACT

An apparatus for vibration reduction in a linear actuator includes one or more sets of counterweights, one or more enclosures configured to receive one set of counterweights for each enclosure, and a driving shaft configured to mount the one or more sets of counterweights. The one or more sets of counterweights are disposed symmetrically with respect to a plane that extends perpendicularly and longitudinally through a longitudinal axis of the linear actuator. The driving shaft extends perpendicularly and transversely through the longitudinal axis and the plane. A portion counterweight of a given set of counterweights may rotate clockwise and another portion counterweight of the given set of counterweights may rotate counterclockwise.

13 Claims, 7 Drawing Sheets

(51) Int. Cl.
*F16F 15/26* (2006.01)
*F16F 15/28* (2006.01)
*H02K 5/24* (2006.01)

(58) Field of Classification Search
CPC ........ F16F 15/262; F16F 15/28; F16F 15/283; H02K 1/00; H02K 5/24; H02K 2213/09; F16C 3/02
See application file for complete search history.

(56) References Cited

U.S. PATENT DOCUMENTS

| | | | |
|---|---|---|---|
| 1,720,504 A | 7/1929 | Williams | |
| 1,755,673 A | 4/1930 | Solenberger | |
| 1,764,815 A | 6/1930 | Williams | |
| 1,796,882 A | 3/1931 | Bowers | |
| 2,028,331 A | 1/1936 | Janicke | |
| 2,187,979 A | 1/1940 | Malpas | |
| 2,392,052 A | 1/1946 | Matheisel | |
| 2,399,683 A | 5/1946 | Loeb | |
| 2,407,790 A | 9/1946 | Le Tourneau | |
| 2,421,164 A * | 5/1947 | Senkowski | F02B 75/222 |
| | | | 123/54.2 |
| 2,831,738 A | 4/1958 | Marien | |
| 2,874,012 A | 2/1959 | Stern | |
| 3,146,940 A | 9/1964 | McCrory et al. | |
| 3,358,656 A | 12/1967 | Panhard | |
| 3,365,879 A | 1/1968 | Panhard | |
| 3,369,733 A | 2/1968 | Campbell | |
| 3,465,161 A | 9/1969 | Cutkosky | |
| 3,610,217 A | 10/1971 | Braun | |
| 3,791,227 A | 2/1974 | Cherry | |
| 3,797,466 A | 3/1974 | Nambu | |
| 3,914,574 A | 10/1975 | Hill et al. | |
| 4,156,410 A | 5/1979 | Ramsey | |
| 4,385,597 A | 5/1983 | Stelzer | |
| 4,414,927 A | 11/1983 | Simon | |
| 4,489,554 A | 12/1984 | Otters | |
| 4,653,274 A | 3/1987 | David | |
| 4,658,768 A | 4/1987 | Carson | |
| 4,803,960 A | 2/1989 | Köppen | |
| 4,831,972 A | 5/1989 | Barnwell | |
| 4,854,218 A | 8/1989 | Stoll | |
| 4,876,991 A | 10/1989 | Galitello, Jr. | |
| 4,932,373 A * | 6/1990 | Carson | F01B 9/02 |
| | | | 123/197.4 |
| 4,979,476 A * | 12/1990 | Islas | F16F 15/26 |
| | | | 123/197.4 |
| 5,022,157 A * | 6/1991 | Chang | B23D 51/16 |
| | | | 30/394 |
| 5,123,245 A | 6/1992 | Vilenius et al. | |
| 5,158,046 A | 10/1992 | Rucker | |
| 5,285,752 A | 2/1994 | Reed et al. | |
| 5,351,659 A | 10/1994 | Chao | |
| 5,676,097 A | 10/1997 | Montresor | |
| 5,710,514 A | 1/1998 | Crayton et al. | |
| 5,816,202 A | 10/1998 | Montresor | |
| 6,035,637 A | 3/2000 | Beale et al. | |
| 6,065,438 A | 5/2000 | Kiesel | |
| 6,164,250 A | 12/2000 | Bailey et al. | |
| 6,170,442 B1 | 1/2001 | Beale | |
| 6,199,519 B1 | 3/2001 | Van Blarigan | |
| 6,240,828 B1 | 6/2001 | Fujimoto | |
| 6,298,941 B1 | 10/2001 | Spadafora | |
| 6,443,107 B1 * | 9/2002 | Mendler | F02B 75/047 |
| | | | 123/48 B |
| 6,467,397 B1 | 10/2002 | Fuchs et al. | |
| 6,722,322 B2 | 4/2004 | Tse | |
| 6,854,429 B2 | 2/2005 | Gelfand | |
| 6,948,459 B1 | 9/2005 | Laumen et al. | |
| 7,032,548 B2 | 4/2006 | Tusinean | |
| 7,194,989 B2 | 3/2007 | Hallenbeck | |
| 7,207,299 B2 | 4/2007 | Hofbauer | |
| 7,318,506 B1 | 1/2008 | Meic | |
| 7,331,407 B2 * | 2/2008 | Stirm | B25D 17/06 |
| | | | 173/201 |
| 7,412,949 B1 | 8/2008 | Cillessen et al. | |
| 9,010,287 B2 | 4/2015 | Morreim | |
| 9,206,900 B2 | 12/2015 | Smith et al. | |
| 2002/0189433 A1 | 12/2002 | Unger et al. | |
| 2004/0244765 A1 | 12/2004 | Elmer | |
| 2005/0284426 A1 | 12/2005 | Tusinean | |
| 2006/0157003 A1 | 7/2006 | Lemke et al. | |
| 2006/0232268 A1 | 10/2006 | Arns, Jr. et al. | |
| 2007/0017684 A1 | 1/2007 | Stirm et al. | |
| 2008/0251050 A1 | 10/2008 | Jacobsen et al. | |
| 2009/0114391 A1 | 5/2009 | Smith, IV et al. | |
| 2011/0073419 A1 | 3/2011 | Matsuzaki et al. | |
| 2011/0239642 A1 | 10/2011 | Schwiesow et al. | |
| 2012/0160190 A1 | 6/2012 | Klöpzig | |
| 2012/0192438 A1 | 8/2012 | Aoki et al. | |
| 2012/0266842 A1 | 10/2012 | Cockerill | |
| 2012/0280513 A1 | 11/2012 | Cockerill | |
| 2013/0276740 A1 | 10/2013 | Wandrie et al. | |
| 2013/0298874 A1 | 11/2013 | Sun et al. | |
| 2014/0116389 A1 | 5/2014 | Khurgin | |
| 2015/0114352 A1 | 4/2015 | McAlister et al. | |
| 2016/0208686 A1 | 7/2016 | Gadda et al. | |
| 2017/0016327 A1 | 1/2017 | Yaakoby | |
| 2017/0044975 A1 | 2/2017 | Yaakoby | |
| 2019/0011011 A1 * | 1/2019 | Higuchi | F16F 15/3153 |

FOREIGN PATENT DOCUMENTS

| | | |
|---|---|---|
| DE | 3518982 A1 | 11/1986 |
| DE | 4136331 A1 | 5/1992 |
| DE | 4447040 C1 | 5/1996 |
| DE | 20 2006018097 U1 | 6/2008 |
| DE | 102008004879 A1 | 7/2009 |
| FR | 1 437 474 A | 5/1996 |
| GB | 337248 | 10/1930 |
| GB | 602310 A | 5/1948 |
| GB | 2183726 A | 6/1987 |
| GB | 2232718 A | 12/1990 |
| GB | 2353562 A | 2/2001 |
| JP | S6238833 A | 2/1987 |
| JP | 63-192916 | 10/1988 |
| RU | 2 500 905 C1 | 12/2013 |
| WO | WO 2015/155912 A1 | 10/2015 |

OTHER PUBLICATIONS

Jan Ridders, "Dual 2stroke model engine," available at URL: https://www.youtube.com/watch?v=gLwHEUJ752s, uploaded May 22, 2013.
Extended European search report in Application No. 16823945.7-1004/3322884 PCT/IB2016001189 dated Jan. 24, 2019.
European examination report in Application No. 15782938.3-1004 dated Oct. 24, 2019.

* cited by examiner

VIBRATION PREVENTION IN A LINEAR ACTUATOR

CROSS REFERENCE TO RELATED APPLICATIONS

This application is a U.S. national phase entry under 35 U.S.C. § 371 from International Application No. PCT/IB2016/001678, flied Oct. 20, 2016, which claims the benefit of priority based on U.S. Provisional Patent Application No. 62/243,677 filed on Oct. 20, 2015, to both of which this application claims the benefit of priority, and the entirety of the subject matter of both of which is incorporated herein by reference.

TECHNICAL FIELD

The present invention relates to the field of vibration prevention, and more particularly to the field of vibration prevention in linear actuators.

BACKGROUND

Vibration propagates via mechanical waves and is detrimental in various engineered systems. Many techniques have been developed to prevent vibrations in such systems. The techniques for vibration prevention generally fall into two categories: passive vibration isolation and active vibration isolation. The passive vibration isolation usually employs materials and/or mechanical linkages that absorb and damp these mechanical waves, for example, mechanical springs and/or pads or sheets of flexible materials such as elastomers, rubber, cork, dense foam, and laminate materials. The active vibration isolation usually involves sensors and actuators that create destructive interference to cancel out incoming vibration.

For example, vibration of an internal combustion engine can significantly impact the performance of the internal combustion engine, and may cause undesirable damage to the internal combustion engine. The techniques that have been employed to reduce or eliminate vibration of an internal combustion engine include a crankshaft damper and an engine mount that attaches an engine to the chassis.

The vibration prevention of the present disclosure may mitigate or solve one or more of the problems set forth in linear actuators and/or free piston engines or linear engines.

SUMMARY

One aspect of the present disclosure is directed to an apparatus for vibration reduction in a linear actuator. The apparatus may include one or more sets of counterweights Each set may be configured to have one or more counterweights. The apparatus may include one or more enclosures configured to receive one set of counterweights for each enclosure, and a driving shaft configured to mount the one or more sets of counterweights. The one or more sets of counterweights may be configured symmetrically with respect to a plane that extends perpendicularly and longitudinally through a longitudinal axis of the linear actuator. The driving shaft may extend perpendicularly and transversely through the longitudinal axis of the linear axis and the plane.

Another aspect of the present disclosure is directed to a linear actuator. The linear actuator includes a piston, a piston rod configured to connect the piston at each side thereof, an enclosed cylinder cavity configured to enclose the piston and a portion of the piston rod, and an apparatus configured to be mounted on the linear actuator and to reduce vibration of the linear actuator. The piston reciprocates within the cylinder cavity during operation of the linear actuator.

BRIEF DESCRIPTION OF THE DRAWINGS

The accompanying drawings, which are incorporated in and constitute part of this specification, together with the description, illustrate and serve to explain the principles of various exemplary embodiments.

For a better understanding of the present invention and to show how the same may be carried out in practice, reference will now be made to the accompanying drawings, in which.

DETAILED DESCRIPTION

The present disclosure is generally directed to a vibration prevention apparatus (also referred to as a vibration prevention assembly herein) for reducing and/or cancelling vibrations generated in a linear actuator. The assembly can be used with any type of linear actuator. Particularly, the vibration prevention assembly according to the present disclosure may be used for preventing vibrations in free piston engines or linear engines.

Figure 1:
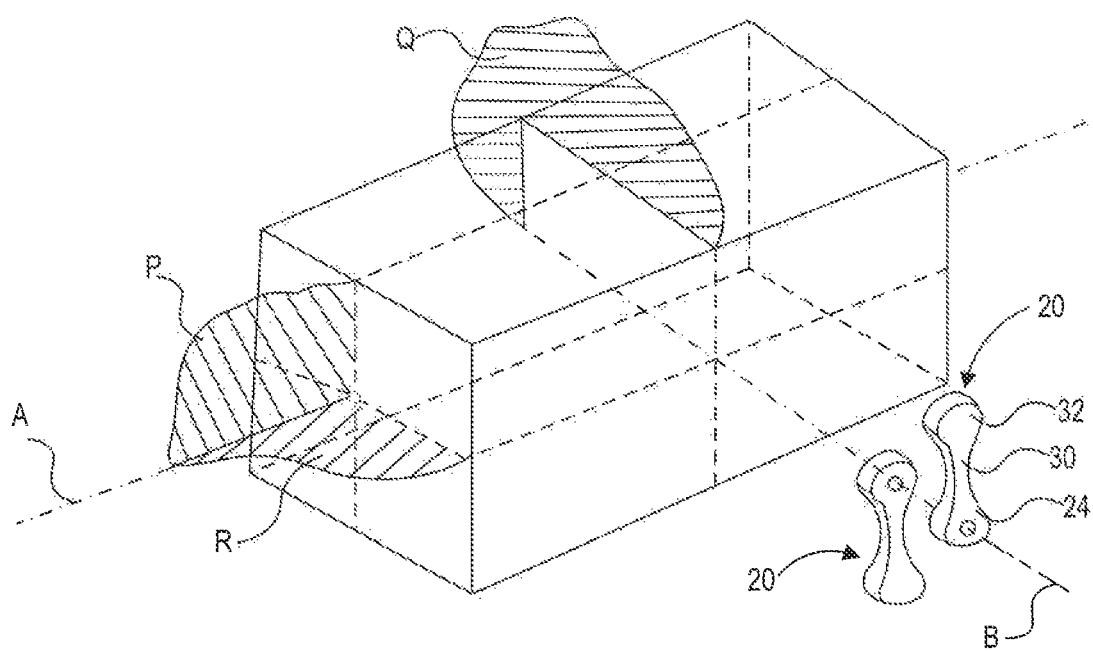
FIG. 1 is a perspective schematic view of an exemplary embodiment of a vibration prevention assembly of the present invention, embodied on a free piston engine.

The assembly comprises a multitude of balancing arms that counter balance the weight and momentum of the piston of the engine with respect to all symmetry planes and with respect to other systems that are connected to the engine, such as power generating units. The symmetry planes may include, for example, planes P, Q, and R as depicted in FIG. 1, which will be described in detail below.

Attention is drawn to FIGS. 1 to 9, which show a vibration prevention assembly 10 according to embodiments of the present invention. For a matter of simplicity, the vibration prevention assembly 10 will hereinafter be called "assembly".

In general, vibration prevention assembly 10 can be used with any linear actuator. According to some embodiments of the present invention, vibration prevention assembly 10 is used for preventing vibrations in a free piston engine 12 in which vibration prevention assembly 10 is mounted thereon.

Free piston engine 12 includes a longitudinal axis A, a piston 14 connected to a piston rod 16 at each side thereof. Piston 14 may freely slide within a cylinder cavity 18 of free piston engine 12.

Figure 5:
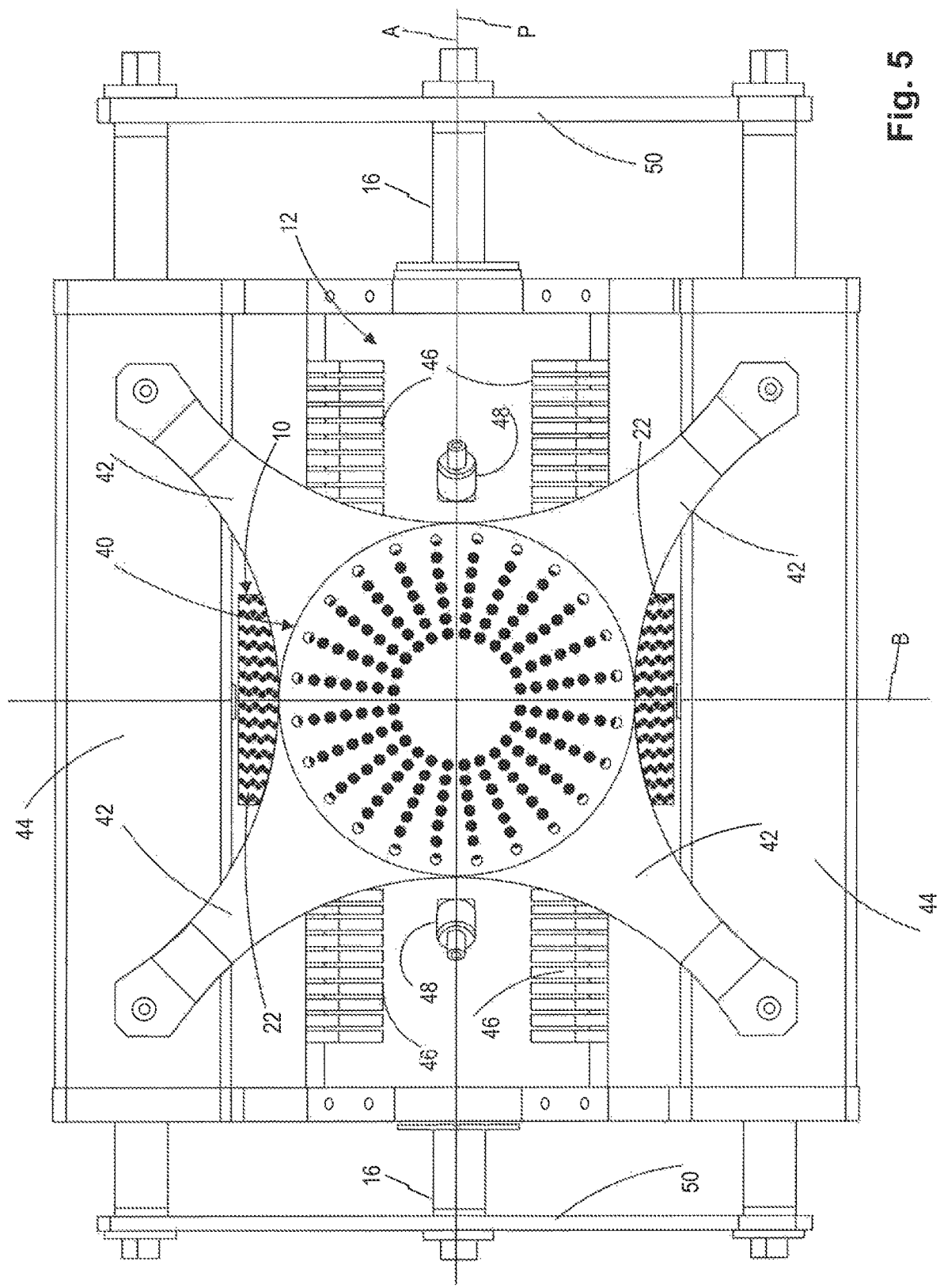
FIG. 5 is a top view of an exemplary embodiment of a vibration prevention assembly of the present invention, embodied in a free piston engine.

FIG. 5 depicts an exemplary embodiment of the vibration prevention assembly of the invention. In the exemplary embodiment depicted in FIG. 5, engine 12 may further include an air blower 40, a set of mounting arms 42, one or more linear electric generators 44, cooling fins 46, one or more fuel injectors 48, cross arms 50, spark plugs 52 (not shown in FIG. 5), and mounting bolts 54 (not shown in FIG. 5). Air blower 40 may be driven by a rotational movement produced by engine 12. Mounting arms 42 may be configured to mount air blower 40 to engine 12. Linear electric generators 44 may be configured to be driven by engine 12 to generate electricity. Fuel injectors 48 may be configured to provide fuel to engine 12. Cross arms 50 may be configured to connecting linear generators 44 and at least ono piston rod 16. Spark plugs 52 may be used to ignite a compressed fuel and air mixture gas. Mounting bolts 54 may be configured to mount assembly 10 to engine 12.

Figure 6:
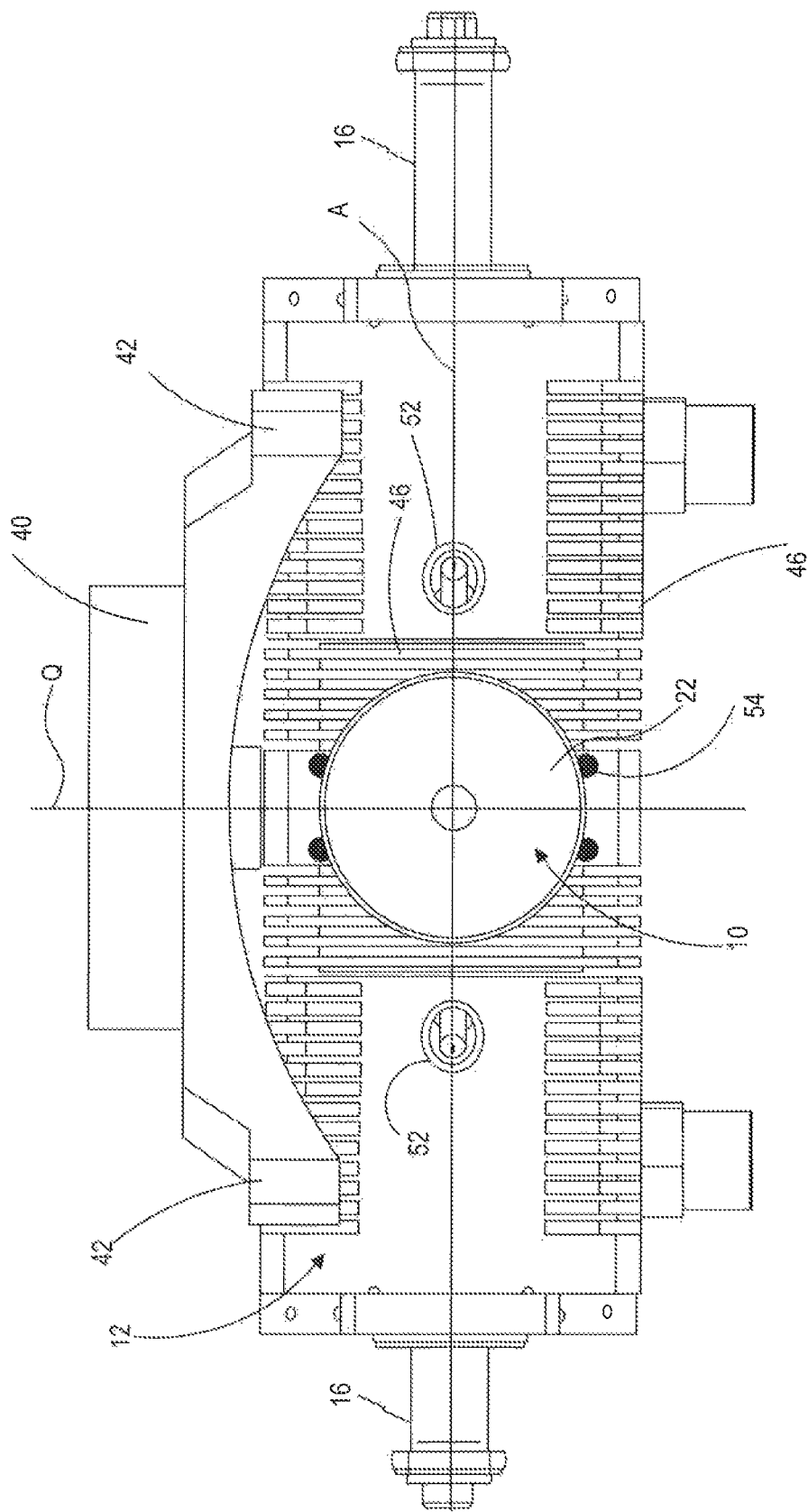
FIG. 6 is a side view of the vibration prevention assembly of FIG. 5.

FIG. 6 depicts a side view of the exemplary embodiment of the vibration prevention assembly depicted in FIG. 5. Spark plugs 52 and mounting bolts 54 are depicted in FIG. 6.

Vibration prevention assembly 10 is symmetrical with respect to a vertical reference plane P that passes through the longitudinal axis A. In the embodiment shown, in FIG. 6, for example, vibration prevention assembly 10 is operable around an assembly axis B that passes through the longitudinal axis A, perpendicularly thereto, and perpendicularly to the vertical reference plane P.

According to a given embodiment of the present invention, vibration prevention assembly 10 comprises two sets of balancing arms 20. Each set of balancing arms 20 comprises two arms and is provided within an arms case 22.

Each balancing arm 20 typically comprises a mounting portion 24, which is in the form of a mounting opening 26 that is mounted on a driving shaft 28, a neck portion 30 extending radially outwardly from the mounting portion 24, and a weight portion 32 that extends radially outwardly from neck portion 30.

Each set of balancing arms 20 is driven by an electric motor that receives a signal from a sensor that senses the position of the piston 14. The electric motor may drive a pinion, having conical gears. The pinion may simultaneously drive two oppositely positioned and oppositely rotating conical gears.

The two conical gears rotating in opposite directions may form a portion of a set of balancing arms 20, that is, the two conical gears may be accounted as a portion of a counterweight comprising the set of balancing arms. The two sets of balancing arms 20 that are located at opposite sides of the reference plane P are mirror images of each other and, in this case, the reference plane P forms a symmetry plane.

The purpose of balancing arms 20 is to counter-balance the weight and momentum that piston 14 applies on free piston engine 12 while moving back and forth within cylinder cavity 18.

Figure 2:
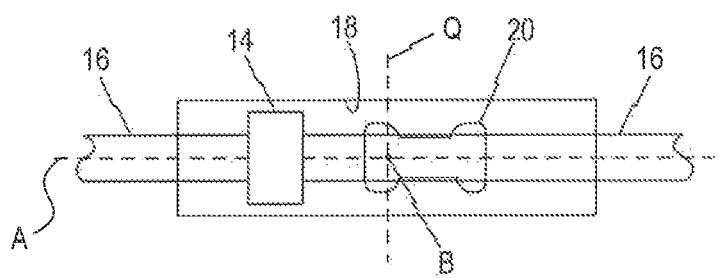
FIG. 2 is a schematic side view of the vibration prevention assembly of FIG. 1 in a first position of the piston of the engine.
Figure 3:
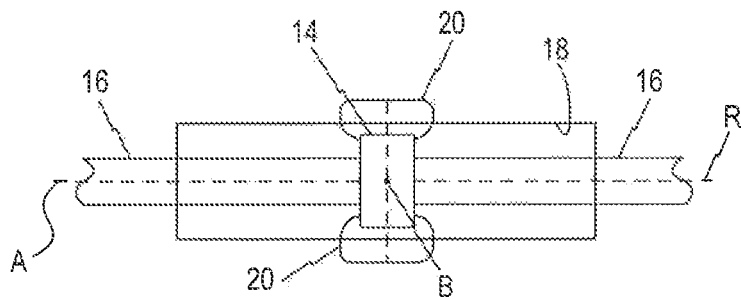
FIG. 3 is a schematic side view of the vibration prevention assembly of FIG. 1 in a second position of the piston of the engine.
Figure 4:
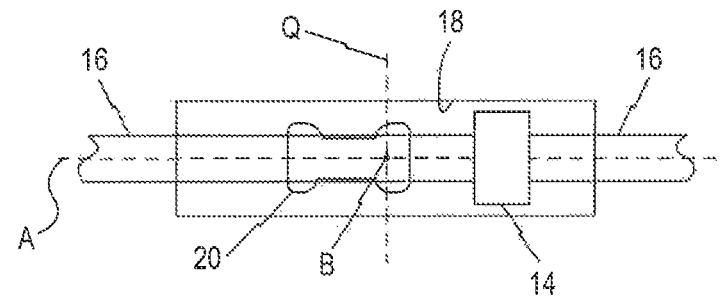
FIG. 4 is a schematic side view of the vibration prevention assembly of FIG. 1 in a third position of the piston of the engine.
Figure 7:
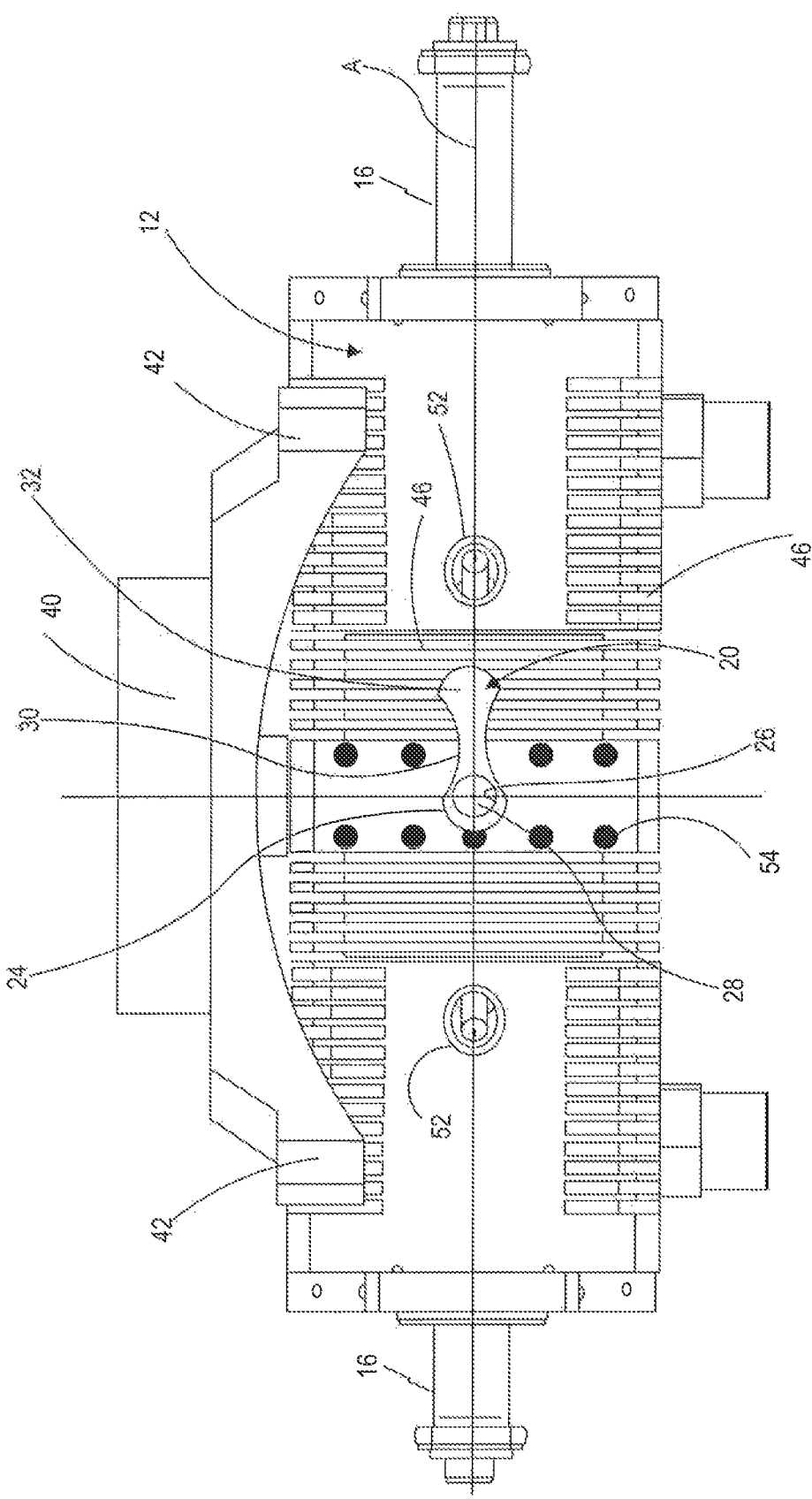
FIG. 7 is a view of the vibration prevention assembly of FIG. 6 showing the balancing arms in a first position of the piston.
Figure 8:
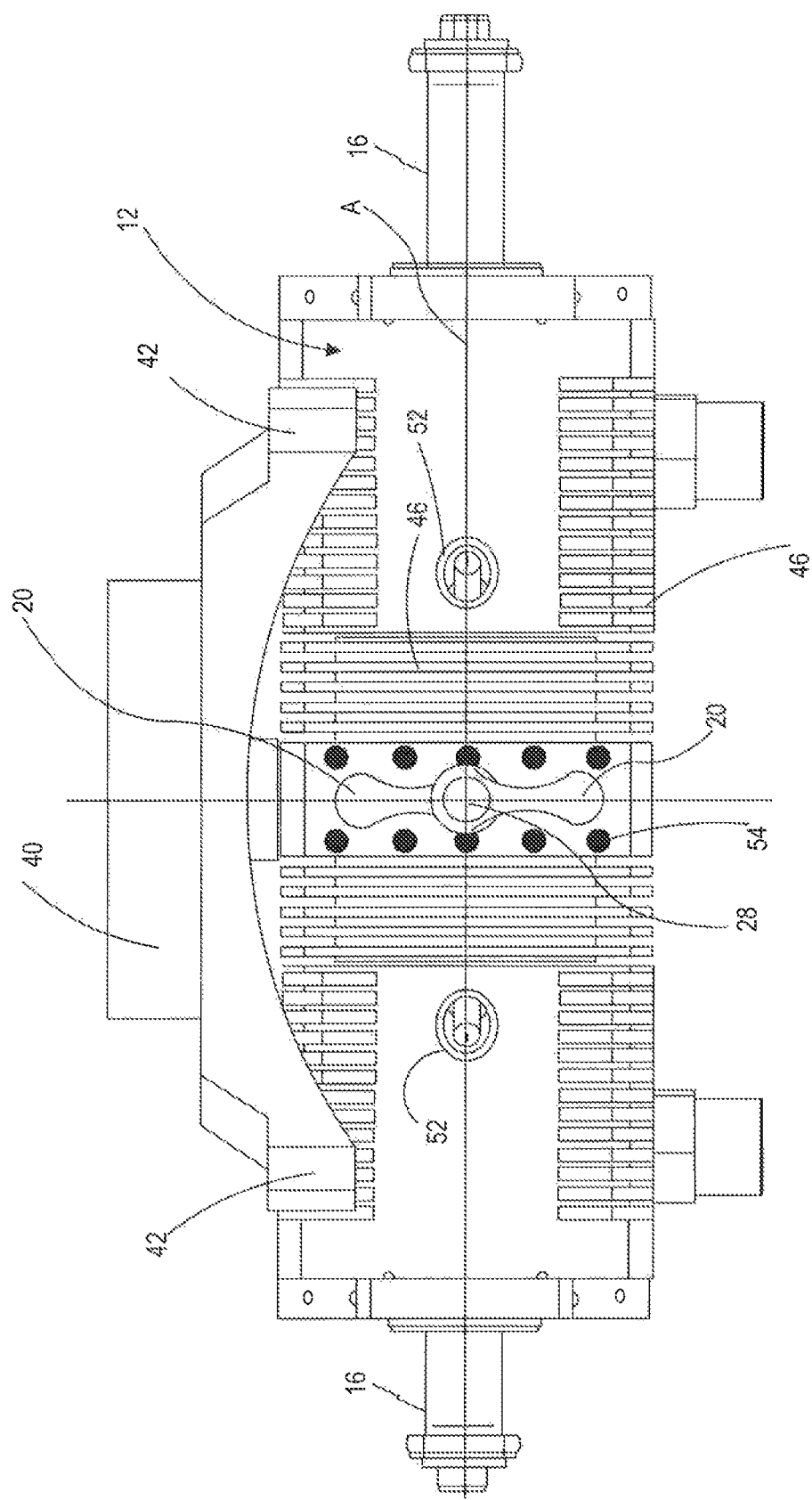
FIG. 8 is a view of the vibration prevention assembly of FIG. 6 showing the balancing arms in a second position of the piston.
Figure 9:
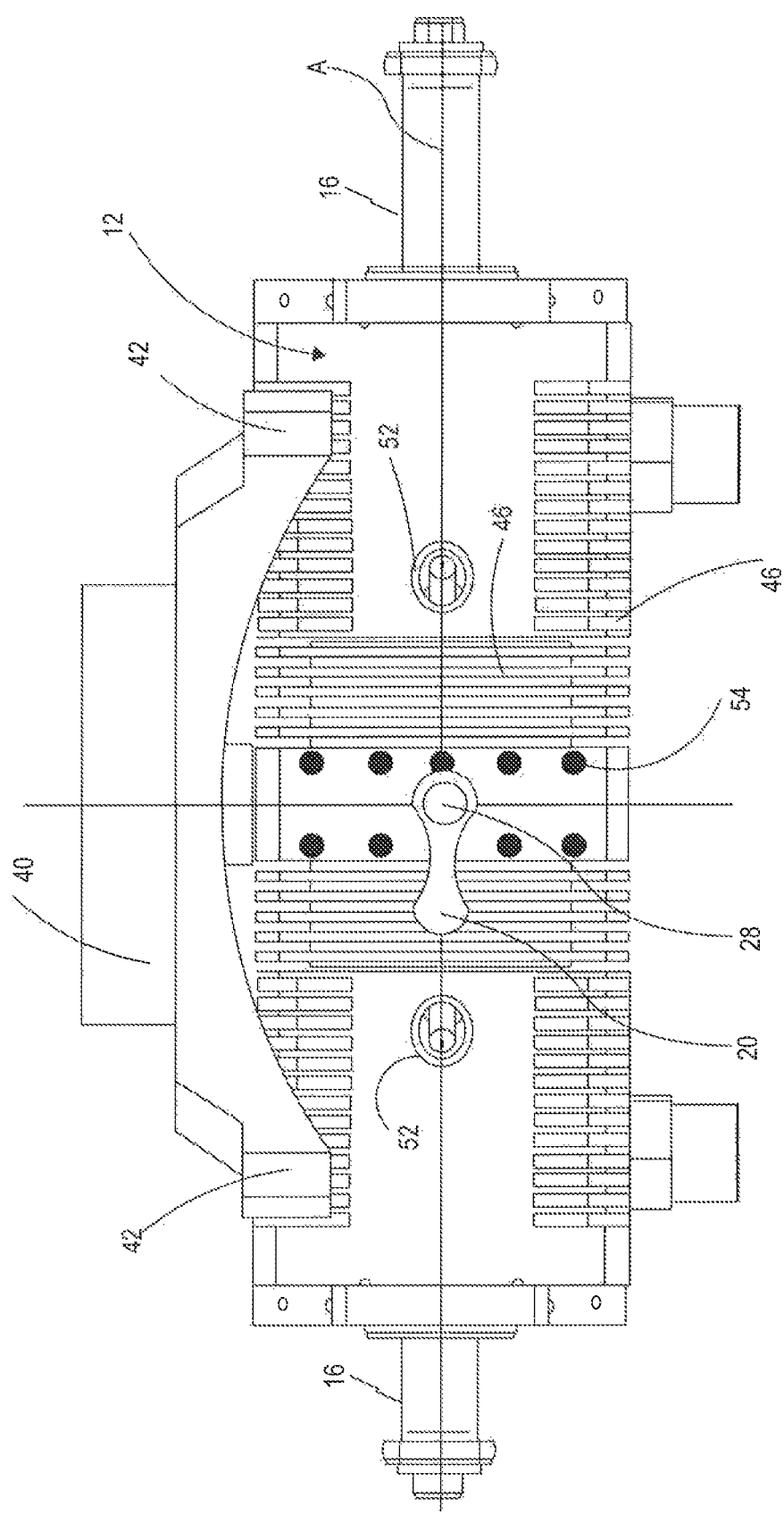
FIG. 9 is a view of the vibration prevention assembly of FIG. 6 showing the balancing arms in a third position of the piston.

FIGS. 1-4 and FIGS. 7-9 depict only one set of balancing arms 20, however, some embodiments of the invention may incorporate multiple sets of balancing arms 20. In particular, vibration prevention assembly 10 may comprise another identical set of balancing arms (not shown) that are a mirror image of the depicted balancing arms 20 with respect to the symmetry plane P. The balancing arms positions in FIGS. 2, 3, and 4 correspond to the balancing arms positions shown in FIGS. 7, 8, and 9, respectively. Reference is made now to FIGS. 2-4, which depict schematic representation of a "transparent" engine so that the principle of operation may be easier described. Although FIGS. 7-9 depict a free piston engine having additional components or elements compared with the corresponding FIGS. 2-4, the principle of operation of vibration prevention assembly 10, as depicted in FIGS. 7-9, is similar, and thus, is not repeated herein.

As shown in FIG. 2, when piston 14 is at its extreme left position, the balancing arms 20 are at their extreme right position, thus balancing the piston with respect to a first plane Q that passes through the assembly axis B and is perpendicular to the longitudinal axis A and to the reference plane P. The balancing of the piston momentum to arrive to this position is counter-balanced by the momentum created by balancing arms 20 in order to get to this position.

As can be seen in FIG. 1, two balancing arms 20 of a given set of balancing arms are located at different planes, i.e., they are differently distanced from the reference plane P. However, in the position shown in FIG. 2, since the two balancing arms 20 are positioned away from the position of piston 14 with respect to the first plane Q, in a side view of assembly 10 two balancing arms 20 overlap each other and therefore only one is shown.

Further in some embodiments, the two oppositely positioned and oppositely rotating conical gears driven by a pinion may each drive one of two balancing arms 20 of a given set of balancing arms such that One of two balancing arms 20 rotates clockwise and the other of two balancing arms 20 rotates counterclockwise to reach the overlap position as depicted in FIG. 2 from a position of two balancing arms 20 depicted in FIG. 1.

As shown in FIG. 3, when piston 14 is at its middle position, balancing arms 20 are at their middle position, i.e., parallel to the first plane. Q. However, if balancing arms 20 would have been overlapping each other, they would have raised a momentum and create a torque around a horizontal plane R that passes through the longitudinal axis A, through the assembly axis B, and is perpendicular to the reference plane P and the first plane Q. For this reason, and in order to prevent built-up of any unwanted torques, in the middle position of the balancing arms 20 they are positioned in opposite directions with respect to the horizontal plane R.

Further in some embodiments, the two oppositely positioned and oppositely rotating conical gears driven by a pinion may each drive one of two balancing arms 20 of a given set of balancing arms such that one of two balancing arms 20 rotates clockwise and the other of two balancing arms 20 rotates counterclockwise to reach the opposite direction position as depicted in FIG. 3 from a position of two balancing arms 20, as depicted in FIG. 2, for example.

As shown in FIG. 4, when the piston is at its extreme right position, balancing arms 20 are at their extreme left position thus balancing the piston with respect to the first plane Q.

Further in some embodiments, the two oppositely positioned and oppositely rotating conical gears driven by a pinion may each drive one of two balancing arms 20 of a given set of balancing arms such that one of two balancing arms 20 rotates clockwise and the other of two balancing arms 20 rotates counterclockwise to reach the position depicted in FIG. 4 from the position of two balancing arms 20 depicted in FIG. 3, for example.

As shown in FIGS. 2 and 4, two balancing arms 20 of a given set of balancing arms 20 move from their extreme right position (FIG. 2) to their extreme left position (FIG. 4), or vice versa, which may be referred to as reciprocation of balancing arms 20 herein.

Thus, as effectively shown and explained, the position and momentum of piston 14 at any given moment is counter-balanced by balancing arms 20 in the following manner: (a) all of the balancing arms 20, four in an exemplary embodiment of the invention, counter-balance the piston with respect to the first plane Q, (b) each set of balancing arms 20 are counter-balanced with respect to the horizontal plane R, meaning a first balancing arm 20 counter-balances a second balancing arm 20, and, (c) each pair of balancing arms 20 counter-balance the other pair of balancing arms 20 with respect to the vertical reference plane P.

By the above shown construction and operation, assembly 10 may effectively eliminates any vibrations during the operation of free piston engine 12.

The vibration prevention assembly of the present invention is not limited to be used with a free piston engine only, and it may be used with other linear actuators, such as mechanisms of machines that have a linear back and forth movement.

If desired, the driving shaft of the pinion may be used as a shaft of a turbine that is used for supplying the engine with forced air. In this case, the rotation of the turbine creates a dynamic balance to the entire structure that the turbine is connected to.

The vibration prevention assembly may comprise other numbers of balancing arms, depending on the structure of the linear actuator and its connected systems.

The balancing arms may have different shapes than the shape described above or depicted in the figures to suit different design needs.

The balancing arms may be integrally formed with their driving shaft, or may be separately connected thereto.

The different sets of balancing arms do not have to be driven by different electric motors, if desired, all the balancing arms may be driven through a single electric motor.

It should be noted that directional terms appearing throughout the specification and claims, e.g., "forward," "rear," "upper," "lower," etc., are used as terms of convenience to distinguish the location of various surfaces relative to each other. These terms are defined with reference to the figures, however, they are used for illustrative purposes only, and are not intended to limit the scope of the invention.

Although the present invention has been described to a certain degree of particularity, it should be understood that various alterations and modifications could be made without departing from the spirit or scope of the invention as hereinafter described.

What is claimed is:

1. An apparatus for vibration reduction in a linear actuator, comprising:
   one or more sets of counterweights, each set comprising one or more counterweights;
   one or more enclosures configured to receive the one or more sets of counterweights; and
   a driving shaft configured to receive the one or more sets of counterweights mounted thereon;
   wherein:
     the one or more sets of counterweights are disposed symmetrically with respect to a plane that extends perpendicularly and longitudinally through a longitudinal axis of the linear actuator;
     the driving shaft extends perpendicularly and transversely through the longitudinal axis and the plane, and the driving shaft is configured to be driven separately from a reciprocating shaft of the linear actuator; and
     each counterweight comprises:
       a mounting portion configured to mount the counterweight to the driving shaft;
       a neck portion configured to extend radially outwardly from the mounting portion; and
       a weight portion configured to extend radially outwardly from the neck portion.

2. The apparatus of claim 1, wherein the linear actuator comprises:
   a piston;
   a piston rod configured to connect the piston at each side thereof: and
   an enclosed cylinder cavity configured to enclose the piston and a portion of the piston rod;
   wherein:
     the longitudinal axis is a central longitudinal axis of the piston rod;
     the piston reciprocates within the enclosed cylinder cavity; and
     the driving shaft is disposed on a plane that the piston is configured to cross as the piston reciprocates.

3. The apparatus of claim 2, wherein the one or more sets of counterweights are positioned outside of the cylinder cavity.

4. The apparatus of claim 1, wherein the apparatus further comprises one or more electric motors configured to drive the one or more sets of counterweights.

5. The apparatus of claim 1, wherein a first portion counterweight of the one or more sets of counterweights rotates clockwise and a second portion counterweight of the one or more sets of counterweights rotates counterclockwise.

6. A linear actuator, comprising:
   a piston:
   a piston rod configured to connect the piston at each side thereof;
   an enclosed cylinder cavity configured to enclose the piston and a portion of the piston rod; and
   an apparatus configured to be mounted on the linear actuator and to reduce vibration of the linear actuator;
   wherein the piston reciprocates within the enclosed cylinder cavity back and forth across a first plane, and the apparatus is configured to balance the piston with respect to the first plane;
   the apparatus comprises:
     one or more sets of counterweights, each set comprising one or more counterweights;
     one or more enclosures configured to receive the one or more sets of counterweights; and
     a driving shaft configured to receive the one or more sets of counterweights mounted thereon;
   wherein:
     the one or more sets of counterweights are disposed symmetrically with respect to a second plane that extends perpendicularly and longitudinally through a longitudinal axis of the linear actuator; and
     the driving shaft extends perpendicularly and transversely through the longitudinal axis and the second plane; and
   wherein the apparatus further comprises one or more electric motors configured to drive the one or more sets of counterweights.

7. The linear actuator of claim 6, wherein the one or more sets of counterweights are positioned outside of the enclosed cylinder cavity.

8. The linear actuator of claim 6, wherein each counterweight comprises:

a mounting portion configured to mount the counterweight to the driving shaft, a neck portion configured to extend radially outwardly from the mounting portion; and a weight portion configured to extend radially outwardly from the neck portion.

9. The linear actuator of claim 6, wherein a first portion counterweight of the one or more sets of counterweights rotates clockwise and a second portion counterweight of the one or more sets of counterweights rotates counterclockwise.

10. The apparatus of claim 6, further comprising:

a driving shaft configured to receive the one or more sets of counterweights mounted thereon, the driving shaft configured to be driven separately from a reciprocating shaft of the linear actuator.

11. A method for vibration reduction in a linear actuator, comprising:

providing a vibration reduction apparatus configured to be mounted on the linear actuator and to reduce vibration of the linear actuator; and mounting the apparatus onto the linear actuator;

wherein:

the linear actuator comprises:

a piston;

a piston rod configured to connect the piston at each side thereof; and an enclosed cylinder cavity configured to enclose the piston and a portion of the piston rod, the piston configured to reciprocate within the enclosed cylinder cavity; and wherein the apparatus comprises:

one or more sets of counterweights disposed symmetrically with respect to a plane that extends perpendicularly and longitudinally through a longitudinal axis of the linear actuator, each set comprising one or more counterweights;

one or more enclosures configured to receive the one or more sets of counterweights; and a driving shaft extending perpendicularly and transversely through the longitudinal axis and the plane and configured to receive the one or more sets of counterweights mounted thereon, the method further comprising counter-balancing the piston with the one or more sets of counterweights with respect to a plane that the piston reciprocates back and forth across; and providing one or more electric motors configured to drive the one or more sets of counterweights.

12. The method of claim 11, wherein mounting the apparatus onto the linear actuator comprises:

positioning the one or more sets of counterweights outside of the enclosed cylinder cavity.

13. The method of claim 11, further comprising:

rotating a first portion counterweight of the one or more sets of counterweights clockwise; and rotating a second portion counterweight of the one or more sets of counterweights counterclockwise.

* * * * *

UNITED STATES PATENT AND TRADEMARK OFFICE
CERTIFICATE OF CORRECTION

| | | |
|---|---|---|
| PATENT NO. | : 11,255,405 B2 | |
| APPLICATION NO. | : 15/769816 | |
| DATED | : February 22, 2022 | |
| INVENTOR(S) | : Shaul Yaakoby | |

It is certified that error appears in the above-identified patent and that said Letters Patent is hereby corrected as shown below:

In the Claims

Claim 2, Column 6, Line 11, "thereof: and" should read --thereof; and--.

Signed and Sealed this
Nineteenth Day of April, 2022

Katherine Kelly Vidal
*Director of the United States Patent and Trademark Office*